Figure 1:
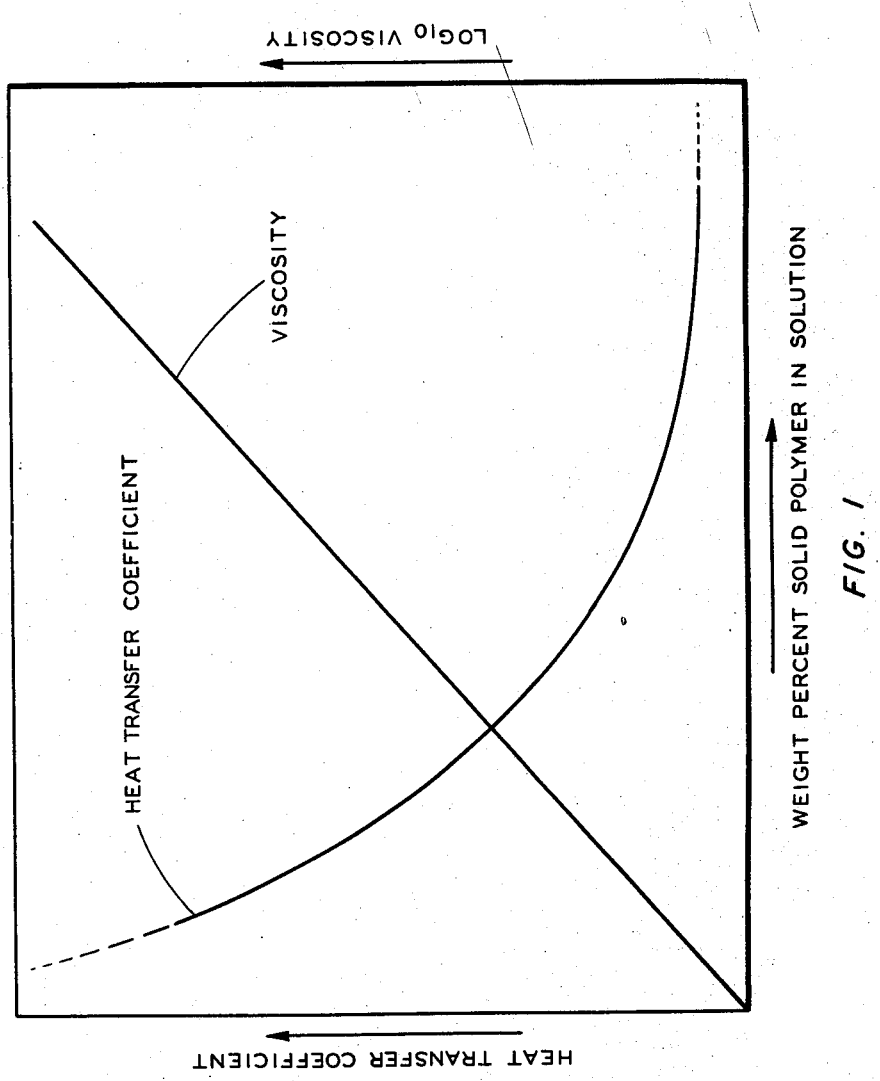

INVENTORS
H.S. KIMBLE
N.F. McLEOD
BY
ATTORNEYS

July 28, 1959   H. S. KIMBLE ET AL   2,897,184
POLYMER-SOLVENT SEPARATION PROCESS
Filed July 5, 1956   3 Sheets-Sheet 3

INVENTORS
H. S. KIMBLE
N. F. McLEOD
BY
ATTORNEYS

United States Patent Office 2,897,184
Patented July 28, 1959

2,897,184

POLYMER-SOLVENT SEPARATION PROCESS

Harvey S. Kimble and Norman F. McLeod, Bartlesville, Okla., assignors to Phillips Petroleum Company, a corporation of Delaware Application July 5, 1956, Serial No. 595,942.

4 Claims. (Cl. 260—94.9)

This invention relates to a process for producing olefinic polymers of high molecular weight. In another aspect, this invention relates to a method of evaporating solvent from a solution of solvent and polymer. In one of its more specific aspects, it relates to a method of separating by evaporation an olefinic polymer from a solution of said polymer in a more volatile hydrocarbon solvent. In another of its more specific aspects, this invention relates to a method of controlling foaming in such an evaporation process.

In several methods of polymerizing aliphatic and cyclic olefins to polymers having high molecular weight, hydrocarbon solvents are used to facilitate the polymerization reaction and subsequent transfer and treatment steps. In such methods, however, the removal of solvent is necessary in order to recover the polymer in a usable form. A few weight percent of solvent remaining in the polymer can cause bubbles, and consequently cavities, in the polymer as it is heated preparatory to molding. Several methods of polymer-solvent separation have been developed which involve flashing the solvent or precipitating the polymer, but it is advantageous in such cases to concentrate the polymer solution as much as practicable prior to these final removal steps. A common method of effecting this concentration is by evaporation in a single effect evaporator.

Polymeric solutions of the type described exhibit viscosity characteristics which present several problems when attempts are made to concentrate these solutions by evaporation. These problems are characterized especially by severe foaming as the polymer concentration nears the desired level, and such foaming necessitates considerable reduction in evaporation rates as attempts to maintain reasonable rates have caused polymer carryover and block-up in downstream equipment. When the evaporation rate is lowered, however, the danger of thermal decomposition of the polymer is present as a result of unduly high residence time in the evaporator at high localized temperatures.

We have discovered a method of concentrating in a reasonable time a solution of high molecular weight olefinic polymers to a satisfactory concentration level for subsequent recovery steps in such a manner that foaming of the solution is substantially eliminated. This is accomplished according to our invention by evaporating the solvent from the solution in two or more steps, first with relatively low polymer concentrations and high evaporation rates and, subsequently, with higher polymer concentrations until the desired concentration is reached, but at considerably reduced evaporating rates, so that foaming does not occur. We have found that not only is foaming substantially eliminated by such a method, but over-all evaporation efficiency is considerably improved. We have further discovered that the maximum rates obtainable in the various steps of our evaporation process with little or no foaming occurring, are, in general, an inverse linear function of the polymer concentration in each solution being concentrated. Thus, with a minimum of experimentation, equipment performance and operating variables can be reasonably anticipated.

It is an object of this invention to provide an improved method of producing olefinic polymers.

It is another object of this invention to provide a method of evaporating a solution of polymer and solvent in such a manner that foaming is substantially eliminated.

It is another object of this invention to provide a method of evaporating hydrocarbon solvent from a solution of olefinic polymers in said solvent at optimum operating conditions.

Figure 2:
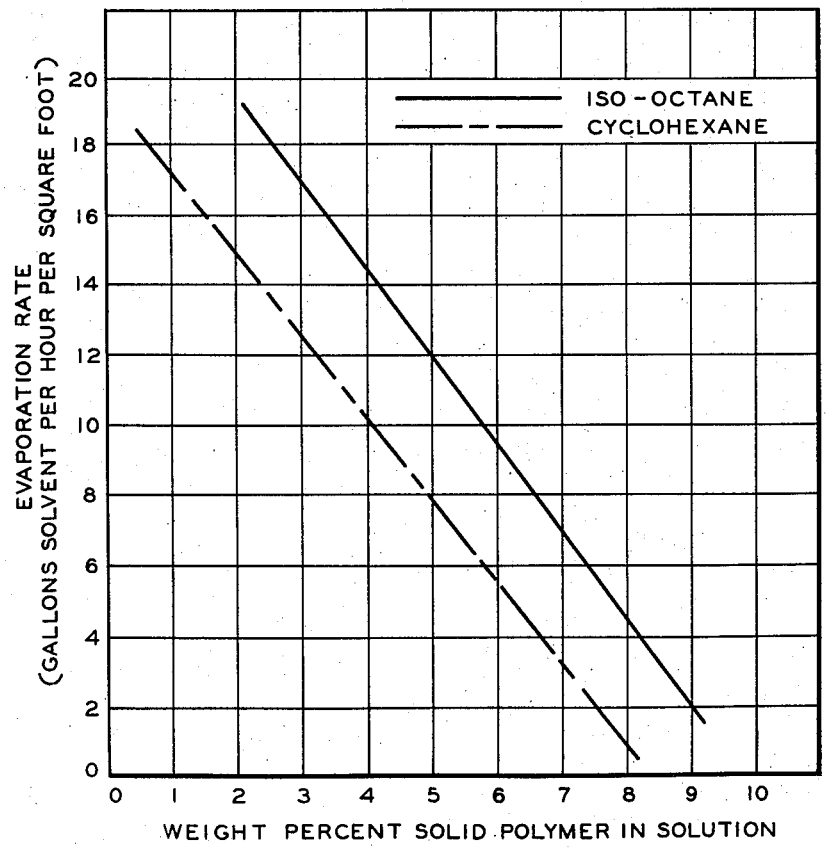
Figure 3:
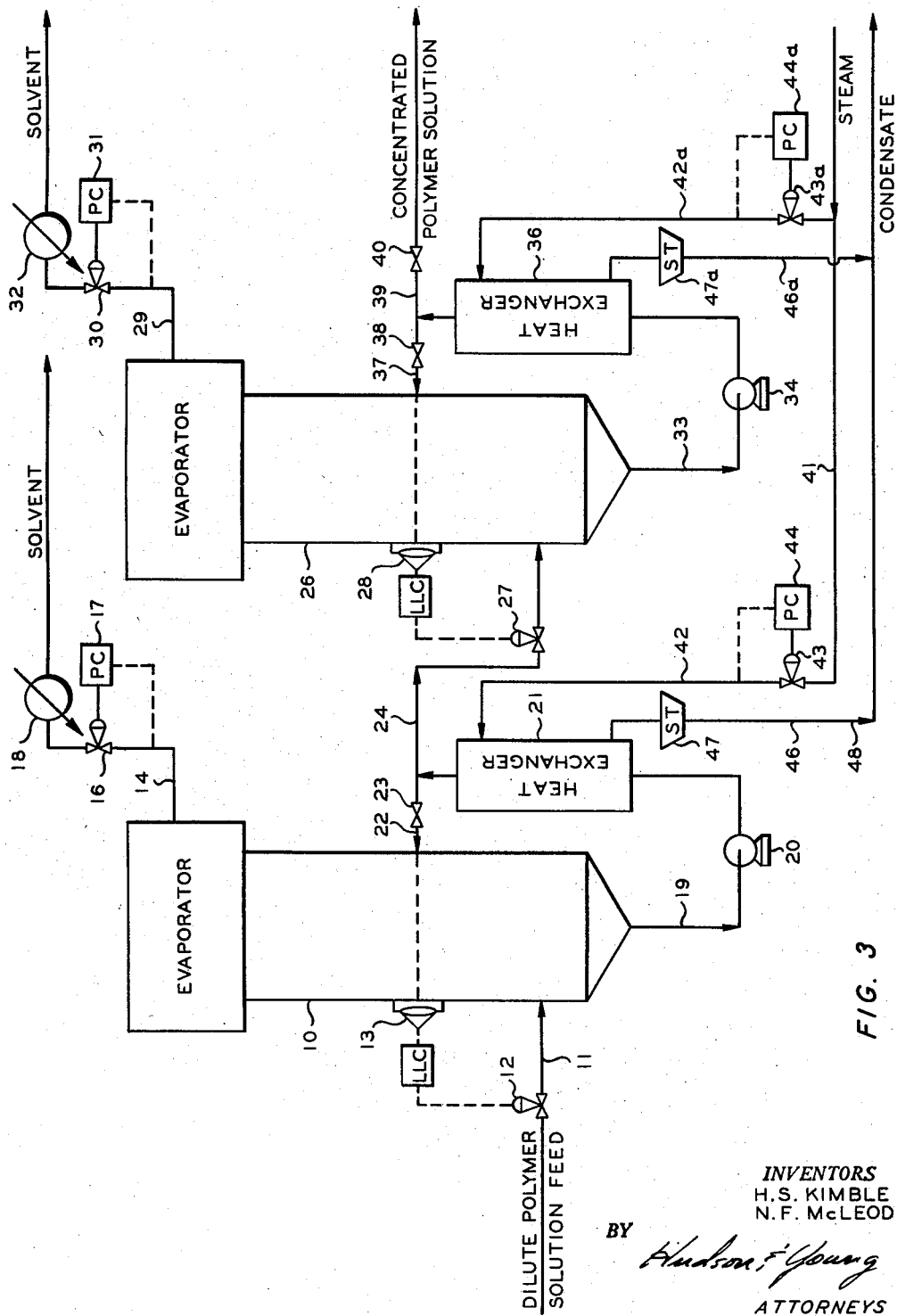

Other objects, features and advantages of this invention will become apparent to those skilled in the art from the following description, examples and drawings, in which:

Figure 1 is a chart showing solution viscosity and heat transfer coefficient as a function of polymer concentration for a solution of polyethylene in cyclohexane at constant temperature, Figure 2 is a chart showing the relationship between maximum evaporation rates and polymer concentration for a solution of polyethylene in selected solvents, and Figure 3 is a flow diagram depicting the process of this invention.

This invention is of particular advantage in processes involving the polymerization and copolymerization of aliphatic and cyclic olefins, especially 1-olefins, including both mono- and diolefins, for example, butadiene and the like. Among examples of the preferred class of products are homopolymers of ethylene, propylene, 1-butene, 1-pentene and the like, and copolymers of ethylene with propylene, 1-butene or butadiene, and the like. In a preferred embodiment of this invention, solutions are processed which contain polymers prepared from aliphatic 1-olefins with a maximum of 8 carbon atoms per molecule and no branching nearer the double bond than the four position, having been polymerized in the presence of a catalyst comprising chromium, a portion of which is hexavalent (preferably at least 0.1 percent by weight of the total catalyst), as chromium oxide associated with at least one oxide from the group consisting of silica, alumina, zirconia, and thoria. The total chromium content for such a catalyst is preferably between 0.1 and 10 weight percent. The polymerization is ordinarily carried out at a temperature between 150 and 450° F., and the pressure can vary over a wide range, for example, from atmospheric to 1,000 pounds per square inch absolute or higher. The olefin is often polymerized in a solvent which is inert and liquid at the polymerization temperature, preferably hydrocarbon solvents such as naphthenic hydrocarbons and paraffinic hydrocarbons of from 3 to 12 carbon atoms, for example isooctane and cyclohexane. The effluent withdrawn from the polymerization reactor comprises a solution of polymer in solvent, generally some monomer, and when slurry or suspended catalyst is used, the solution also contains catalyst. Unreacted olefin is removed by flashing; and the solution with or without the addition of more solvent is filtered or centrifuged to remove suspended catalyst. The catalyst removal step is optional and in some cases catalyst is allowed to remain in the finished polymer.

The solvent is then removed from the polymer by flashing or precipitation and it is desirable to concentrate the polymer solution prior to these solvent removal steps. In our invention, this solution concentration step is performed in multiple evaporation effects. The purpose of this is not greater thermal efficiency, which is a natural result of our invention, but in order to control the severe foaming which would otherwise occur.

This invention is also applicable for processing solutions of polymers which have been prepared in the presence of catalyst systems such as organo-metal compounds mixed with compounds of metals of groups 4 to 6 of the periodic system, for example, triethylaluminum with titanium tetrachloride, monoethylaluminum dichloride and diethylaluminum chloride with titanium tetrachloride, and the like. The term "polyethylene" as used in this specification and the drawings refers, unless otherwise indicated, to polymers of ethylene prepared by processes as outline above.

A better understanding of this phenomenon can be had by reference to Figure 1, which shows heat transfer coefficient and viscosity of a polyethylene and cyclohexane solution as a function of polymer concentration, with temperature constant. As shown by this chart, polyolefin hydrocarbon solvent solutions exhibit the unique feature of a rapid increase in viscosity and a likewise rapid decrease in heat transfer coefficient with relatively small changes in the polymer concentration. This is true even though the polymer concentration is relatively dilute, for example, from 1 to 10 weight percent. It has been found that the tendency of a polymeric solution to foam is directly related to its viscosity; therefore, as the polymer concentration approaches the desired level for the subsequent solvent removal step, viscosity of the solution greatly increases and the foaming becomes unmanageable unless evaporation rates are considerably reduced.

Referring now to Figure 2, we have shown that the maximum evaporation rates without excessive foaming for various concentrations of polyethylene in isooctane or cyclohexane are generally an inverse linear function of said polymer concentration. This chart is based on experimental data with evaporators of conventional design having a cross-sectional area of approximately 2.2 square feet. This relationship, as shown by Figure 2, is extremely useful in equipment design and calculations for establishing optimum operating conditions.

In accordance with the above discussion, this invention enables a smooth and economical concentration of polymer solutions by performing a solvent evaporation in a series of stages, each subsequent stage operating at higher polymer concentrations and lower solvent evaporation rates. Dilute polymer solution is first fed to an evaporation zone where the solution being evaporated is maintained at an intermediate polymer concentration sufficiently low that a high evaporation rate is enjoyed with substantially no foaming. The solution of intermediate concentration is then transferred to one or more subsequent evaporation zones where it is further concentrated at lower evaporation rates until the desired polymer concentration level is reached.

Referring now to Figure 3, dilute polymer solution enters evaporator 10 by way of conduit 11 through valve 12, which is controlled by liquid level controller 13 in order to maintain a substantially constant liquid level within the evaporator. Solvent is evaporated from the solution at a rate below that which causes foaming and is withdrawn from the evaporator by way of vapor exhaust conduit 14. Valve 16 in conduit 14 is controlled by pressure controller 17 and maintains the required pressure in evaporator 10. Solvent vapor is condensed in cooler 18 and may be reused in the polymerization process. The solution within evaporator 10 is continuously circulated through conduit 19 by pump 20 so that it passes through heat exchanger 21 where the solution is heated prior to returning to evaporator 10 by way of conduit 22 through valve 23. Part of the recycled solution stream is withdrawn through conduit 24 and fed to evaporator 26 as controlled by valve 27 in response to liquid level controller 28. The operation of evaporator 26 is similar to that of evaporator 10 except that the polymer concentration is maintained at a higher level and the solvent evaporation rate is considerably reduced so that foaming does not occur. Solvent vapors are withdrawn through conduit 29 and valve 30 controlled by pressure controller 31, and said vapors are condensed in cooler 32. The solution within evaporator 26 is heated by circulating it through conduit 33 and pump 34, heat exchanger 36 and conduit 37 returning to evaporator 26. Valve 38 in conduit 37 and valve 40 in conduit 39 are balanced to withdraw concentrated polymer solution at the desired rate. In the system shown, the evaporative heat source is provided by external heat exchangers which utilize live steam from the conduit 41 entering heat exchangers through valve 43 in conduit 42 as controlled by pressure controller 44. Condensate is removed from the heat exchangers through steam trap 47 and passes via conduit 46 to condensate return line 48. Although external heating sources are shown, heating means inside the evaporators could be used as well.

The dilute polymer solution being fed to the first evaporation stage is generally in the range of about 1 to 4 percent polymer by weight. Although more dilute concentrations can be employed, the optimum concentrations of the solutions as maintained in the various evaporative stages will depend primarily upon the viscosity characteristics of the particular polymer-solvent solution being processed. For solutions of polyethylene in isooctane or cyclohexane, the polymer concentration in the first stage will generally be about 3 to 5 weight percent polymer, preferably about 4 percent. For the same polymer solution, the final evaporation stage will generally be operated with about 6 to 9 weight percent polymer, preferably about 7 to 8 percent. The pressures maintained in the various stages must be sufficiently high that the solvent vaporizes at a temperature above the solution temperature of the polymer in this solvent. For example, the solution temperature of 1 to 4 weight percent polyethylene in cyclohexane is approximately 170 to 190° F., and the temperature of the process for this solution must not be allowed below this range. The heat input for each evaporation stage must be sufficient to maintain a reasonable evaporation rate below the minimum rate at which foaming of the solution occurs. Ordinarily the evaporation rate in the first stage is in the range of about 5 to 20 gallons of solvent per hour per square foot evaporator cross-sectional area, and in the final stage about 0.5 to 12 gallons per hour per square foot. Intermediate stages are operated at evaporative rates between these ranges; and although this invention can be practiced using rates above or below these ranges, the evaporation rate of each stage must be below the rate used in the stage immediately preceding it in the process, generally from 5 to 95 percent below the preceding rate and preferably from 10 to 80 percent lower. For the processing of polyethylene in a cyclohexane or isooctane solution, from two to four evaporation stages are preferred with first stage evaporation rates in the range of 6 to 16 gallons per hour per square foot and final stage rates about 1 to 10 gallons per hour per square foot. Optimum rates are dependent in each case upon viscosity characteristics of the polymeric solution and number and design of evaporators used to practice this invention.

To further clarify the operation of our invention, a specific example will be discussed in connection therewith. In this example, a solution of polyethylene dissolved in isooctane was concentrated to about an 8 percent by weight concentration of polymer. The polyethylene was prepared in a stirred reactor in the presence of a chromium oxide-silica-alumina catalyst in an isooctane suspension. The ethylene, dissolved in the isooctane, was polymerized at a pressure of approximately 500 pounds per square inch absolute and a temperature of approximately 300° F. The reactor effluent was flashed to remove unreacted ethylene and filtered to remove suspended catalyst. Additional isooctane was added to replace that vaporized in the monomer removal steps and to facilitate the filtration. The dilute polymer feed to the evaporators contained about 1 weight percent polyethylene and was substantially free of monomer and catalyst. The cross-sectional area of each evaporator was 2.2 square feet. Evaporation was performed in two effects, each operating in series at a pressure of 40 pounds per square inch gauge and 300° F. A material balance showing the operation of this invention as applied in the present example is shown in Table I.

*Table I.—Material balance for series evaporation of polyethylene-isooctane solution*

[Evaporators=2.2 square feet cross-sectional area.]

|  | First Effect | | | Second Effect | | |
|---|---|---|---|---|---|---|
|  | Feed | Overhead Vapors | Effluent Liquid | Feed | Overhead Vapors | Effluent Liquid |
| Polymer Concentration (wt. percent) | 1 | -------- | 4 | 4 | -------- | 8 |
| Solution (lbs. per hr.) | 228 | -------- | 57 | 57 | -------- | 28.5 |
| Solvent (lbs. per hr.) | 225.7 | 171 | 54.7 | 54.7 | 28.5 | 26.2 |
| Polymer (lbs. per hr.) | 2.3 | -------- | 2.3 | 2.3 | -------- | 2.3 |

The solution of this example was concentrated to a desired polymer percentage at a satisfactory rate with substantially no foaming. While only two effects were used in the example, other intermediate effects could be utilized. Although the exact number of evaporation effects is a matter of economic choice, there must be at least two stages for the practice of this invention. Thus it can be seen from the above description and examples that an otherwise inoperable process for a concentration of polymeric solutions can be used with surprising success by the practice of our invention.

While this invention has been described in connection with present preferred embodiments thereof, it is to be understood that this description is illustrative only and is not intended to limit the invention unduly.

We claim:

1. In a process for the production of a normally solid polymer of an aliphatic 1-olefin having from 2 to 8 carbon atoms per molecule with no side branching nearer the double bond than the 4-position polymerized in the presence of a catalyst containing chromium oxide associated with at least one oxide selected from the group consisting of silica, alumina, zirconia, and thoria in a normally liquid solvent selected from the group consisting of naphthenic hydrocarbons and paraffinic hydrocarbons having not over 12 carbon atoms per molecule wherein a solution is formed comprising from 0.5 to 4 weight percent of said polymer in said solvent, the improved method of concentrating said solution which comprises introducing said solution into a first evaporation zone, evaporating solvent in said first zone at a rate of about 6 to 16 gallons per hour per square foot of evaporator cross-sectional area, thereby forming an intermediate solution comprising from 3 to 5 weight percent of said polymer, transferring said intermediate solution to a second evaporation zone, evaporating solvent in said second zone at a rate below the rate in said first zone and in the range of about 1 to 10 gallons per hour per square foot of evaporator cross-sectional area, thereby forming a final solution comprising 6 to 9 weight percent of said polymer, and transferring said final solution to subsequent polymer recovery steps.

2. The process of claim 1 wherein said polymer is polyethylene.

3. The process of claim 2 wherein said solvent is cyclohexane.

4. The process of claim 2 wherein said solvent is isooctane.

References Cited in the file of this patent

UNITED STATES PATENTS

| 2,472,037 | Wurth et al. | May 31, 1949 |
| 2,523,289 | Frolich | Sept. 26, 1950 |
| 2,677,002 | Yahnke et al. | Apr. 27, 1954 |
| 2,728,758 | Field et al. | Dec. 27, 1955 |